United States Patent [19]

Wahren

[11] Patent Number: 4,605,121

[45] Date of Patent: Aug. 12, 1986

[54] ARRESTING BUFFER FOR OBJECTS ON CONVEYORS

[75] Inventor: Mats E. Wahren, Vadstena, Sweden

[73] Assignee: EWAB Ejvin Wahren AB, Vadstena, Sweden

[21] Appl. No.: 692,353

[22] Filed: Jan. 16, 1985

[30] Foreign Application Priority Data

Nov. 9, 1984 [SE] Sweden ............................. 8402948

[51] Int. Cl.$^4$ .............................................. B65G 37/00
[52] U.S. Cl. .............................. 198/803.01; 198/465.1
[58] Field of Search ............ 198/648, 795, 472, 803.01, 198/465.1, 465.2; 267/140, 153

[56] References Cited

U.S. PATENT DOCUMENTS

| | | | |
|---|---|---|---|
| 2,424,055 | 7/1947 | Rousseau | 198/795 |
| 3,049,214 | 8/1962 | Cormia et al. | 198/472 |
| 4,220,435 | 9/1980 | Yeakey | 198/472 |

Primary Examiner—Joseph E. Valenza
Assistant Examiner—Kyle E. Shane

[57] ABSTRACT

A conveyor (1) for objects (6) conveyed between assembly or processing stations includes a base member (3) with a central trough defined by side walls (4,4), with a continuously traveling conveying means (2) at the bottom of the trough, and carriers (7) for conveying the objects (6). The carriers are guided in the trough, are glidable against the conveying means and conveyed by it and have arresting buffers (9) arranged in the trough between them. The buffers comprise elastic rings which are compressed in the conveying direction of the conveying means between a carrier stationary in an assembly or processing station and a further carrier moving towards this carrier. On compression, the ring (9) is expanded transversely against the side walls (4,4) of the trough, causing the moving carrier to be elastically braked while the braking force is taken up in the side walls via friction of the rings against them, to prevent harmful impact against the stationary pallet.

11 Claims, 11 Drawing Figures

ARRESTING BUFFER FOR OBJECTS ON CONVEYORS

FIELD OF THE INVENTION

The present invention relates to an arresting buffer for objects conveyed between assembly or processing stations on conveyors including a continuously moving conveying means, which is guided in its movement between parallel walls on either side of the conveying means, the conveyed objects being arrested by stops at selected stations and kept stationary thereat a predetermined time for assembling or processing while gliding against the conveying means.

BACKGROUND OF THE INVENTION

In mass production, preferably of small objects such as occurs in the automobile industry, conveyors are used to an increasing extent for moving the objects between different assembly or processing stations. A conveyor system of the kind in question is very flexible and has, inter alia, the advantage that the station may be arranged in the manufacturing facility without necessarily being dedicated to a discontinuously operating, usually straight-line conveyor, as with a so-called transfer line. These flexible conveyors have a continuously moving conveying means which can be guided rectilinearly and in curves for reaching the stations in question, and after a given assembly operation or processing they move the object further to the next station. The conveying means may be of the flexible link type, which is guided in a trough defined by vertical side walls. The objects are glidably supported on the conveying means either directly or by means of carriers or pallets, which in turn are effectively supported on the conveying means and are guided in the trough forming part of the conveyor. The conveying means and the carriers, or their supporting surfaces if the carriers are carried thereby, are made from material providing sufficient friction for the object to accompany the movement of the conveying means, while allowing gliding movement on the conveying means without excessive loss of power when the carrier and its objects are stationary. When the carrier or pallet arrives at a station, stops are triggered which stop the carrier and maintain it in a desired position for a working operation on the object. The object is retained on the carrier with clamping means or the like appropriate to the purpose.

In many cases the conveying means has relatively high velocity, in certain cases up to 70 meters per minute or more. Since there are difficulties in practice with regard to coordinating the processing time at each station so that each carrier is kept exactly the same length of time in each station, certain variations in the conveying flow of objects may result in that one or more carriers may collect behind a stationary carrier at a particular station. The following carrier or carriers must then be arrested while awaiting their turn for processing in the station in question. In such case, a carrier should not directly strike, with high velocity a stationary carrier having its objects processed, since this could detrimentally affect the processing carried out at the station. The following carrier should therefore be braked so that a problematic shock reaction is avoided. To minimize such shock reaction it is known to simply provide the carriers with rubber buffers. Such an arrangement is however not sufficient for damping the shock between the carriers. Also, for chain conveyors provided with link rollers it is known to arrange special friction bands for braking the link rollers.

These known arrangements are however, not satisfactory or they require a conveyor having a special and complicated implementation.

SUMMARY OF THE INVENTION

The invention has as one of its objectives the provision, in a conveyor of the kind mentioned, of an arresting buffer in the form of a braking device which effectively takes up and dampens a shock which otherwise will occur when a following carrier strikes a stationary carrier at the processing station. The arresting buffer or braking device of the invention is characterized in that it includes elastic members which glidably accompany a conveying means of a conveyor and which are located between the objects to be worked on or the carriers which carry the objects, the elastic members on compression in the conveying direction, caused by a moving carrier or object approaching a stationary one, expanding laterally against the guiding walls of the conveying means so that the following object or carrier is braked elastically, the braking force being taken up in the guide walls due to the frictional enagement therewith.

By this arrangement there is achieved an elastic buffer action as well as translation of the primary braking force to the guide walls due to the frictional engagement of the arresting buffer with said walls. A minor portion of the absorbed kinetic energy from the following object or pallet may be applied to the stationary pallet, but the force acting here is insignificant compared to the force which causes lateral expansion of the arresting buffer. Hence, no shock effect is experienced by the stationary object.

The arrangement described is preferably used in conveyors with carriers which rest against the conveying means by way of support blocks which are guided between the walls which also guide the conveying means.

The elastic buffer comprises an elastic means preferably in form of a cylindrical ring which glidably rests on the conveying means between two objects or carriers, and has outer dimensions such that when it is compressed in the conveying direction it expands laterally to develop the necessary braking frictional forces against the side walls. The arresting buffer can thus comprise an elastic ring or an elastic ring provided with a core suitably arranged glidably to rest on the conveying means. The elastic member is usually freely movable between the objects, but may also be connected to a carrier with a certain freedom of movement relative to the carrier for unhindered lateral expansion.

When the conveying means follows a curve, a further improved braking action in the curve is provided by modified guide rings, preferably of the same material as the arresting buffer, the rings being rotatably mounted about the support blocks that guide the carrier on the conveyor. During braking the arresting buffer will be compressed between two such guide rings to prevent their rotation, whereby an effective braking frictional force is developed between the guide rings and the side walls in the curve region of the conveyor. It will be understood that further dampening during braking is obtained by virtue of the elasticity of the guide ring itself.

BRIEF DESCRIPTION OF THE DRAWINGS

The invention, in various embodiments, will now be described in detail and with reference to the accompanying drawings, in which.

DISCLOSURE OF THE INVENTION

Figure 1:
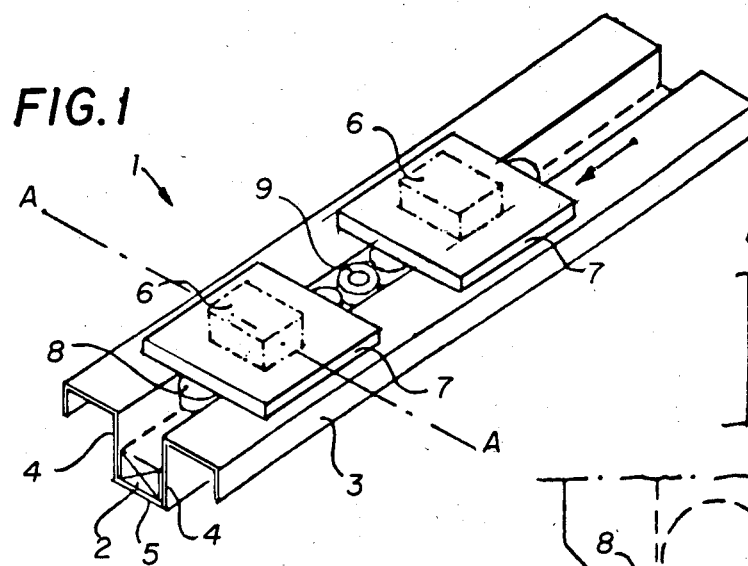
FIG. 1 is a perspective view of a conveyor with carriers and shows one embodiment of the arresting buffer of the invention.

A conveyor for carriers is generally denoted by the numeral 1 in FIG. 1. The conveyor includes a base member 3 in the form of a metal section with a central trough defined by two side walls 4, 4 and a bottom 5. From the upper edges of the side walls there are horizontal extensions which terminate in downwardly extending reinforcing flanges. A conveying means 2 runs along the bottom of the trough in engagement with the bottom 5 and with clearance to the side walls 4. The conveying means extends upwards to approximately half the height of the side walls. The carriers or pallets 7, 7 are guided in the central trough by support blocks 8 rigidly connected to the carriers and resting on the conveying means 2 to accompany it in its travel. The carriers 7 are formed as horizontal plates with a clearance from the underlying horizontal extensions of the conveyor 1. There is also a small clearance between the support blocks 8 and the side walls 4, 4. The conveying means 2 comprises links which enable the conveying means to be guided in relatively tight curves, and it is made from a material such as an acetal resin (sold under the trade name DELRIN)* with suitable properties for gliding against the steel base member 2. The support block 8 can be made from steel, for example.

*DELRIN is the registered trademark of E. I. Du Pont De Nemours and Co.

Objects 6, schematically denoted by dot-dash lines and shown as blocks are removably clamped to the carriers 7.

Figure 2:
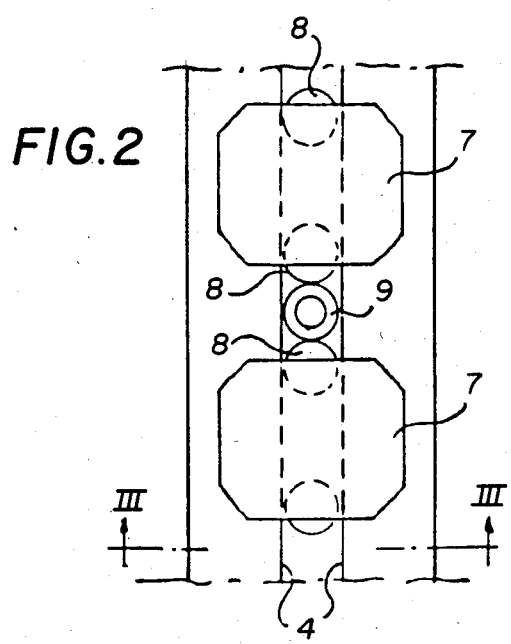
FIG. 2 is a plan of the conveyor shown in FIG. 1.

The support blocks 8 normally project somewhat beyond the carriers in the conveying direction. An arresting buffer in the form of an elastic ring 9, which may be made of a material such as urethane, is arranged between two support blocks 8 of adjoining carriers in the manner shown in FIGS. 1, 2 and 8. This ring has a cylindrical shape and is of a diameter such that a small clearance is provided between its outer circumference and the side walls 4, 4. The height of the ring corresponds to the vertical distance between the upper side of the means 2 and the height of the side walls of the base member 3. The ring 9 is made from elastic material with the property of being able to attenuatingly take up deformation forces, particularly in a direction at right-angles to the axis of the ring.

The system functions in the following way.

Figure 8:
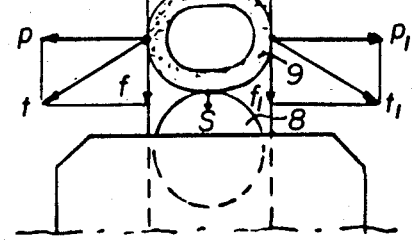
FIG. 8 illustrates in plan a deformed arresting buffer of the type shown in FIGS. 4 and 5, between two carriers, during elastic force take-up on engaging the side walls of the conveyor.
Figure 3:
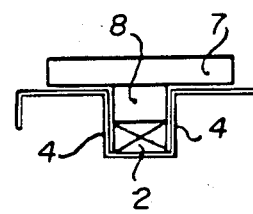
FIG. 3 is a section along line III—III in FIG. 2.

The object 6 illustrated to the left as viewed in FIG. 1 is assumed to be stationary in an assembly or processing station, schematically denoted by the line A—A. The conveying means 2 travels in the direction of the arrow in FIG. 1, taking with it the right hand carrier 7 and its object 6. The movable carrier 7 is moved in the direction of the arrow by the conveying means until it is hindered in its movement via ring 9, by the stationary carrier 7. By virtue of the kinetic energy of the moving carrier, a force is applied to the ring 9 in the conveying direction which compresses the ring in the conveying direction and simultaneously expands it transversely, as illustrated in FIG. 8. The ring 9 is thus pressed against the opposing side walls 4,4 of the conveyor with the opposingly directed transverse forces p, $p_1$. The ring is simultaneously urged somewhat forward in the conveying direction to develop corresponding frictional forces f, $f_1$. Since the lateral forces p, $p_1$ are not developed until a certain counterforce can be applied to the forward portion of the ring, the ring will apply a small force s against the stationary carrier via its support block 8. However, inasmuch as this force s is small compared with the developed lateral forces p, $p_1$ and the respective frictional f, $f_1$, as well as being developed gently and elastically in the initial stages of the deformation of the ring, its effect on the stationary carrier may be ignored. The actual braking force will be taken up by the side walls 4,4, against which the resultant force t, $t_1$ from the ring 9 is applied.

The braking action against the moving carrier or pallet may be controlled by suitably selecting the clearance between the outer circumference of the ring and the walls 4,4. This clearance should preferably be as small as possible, bearing in mind that a sufficient clearance should be provided for practical reasons, so that the ring will not unintentionally bind against the conveyor side walls.

If desired, more than one ring may be used as an arresting buffer, e.g. two rings in tandem. Braking in that case can be effected even more gently, with further reduction of the effect of the moving carrier on the stationary carrier.

Figure 9:
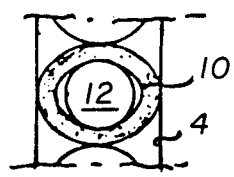
FIG. 9 illustrates the corresponding deformation of an arresting buffer in accordance with the embodiment of FIGS. 6 and 7.
Figure 6:
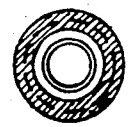
FIGS. 6 and 7 illustrate a further embodiment of an arresting buffer, FIG. 6 being a section along the line VI—VI in FIG. 7.
Figure 7:
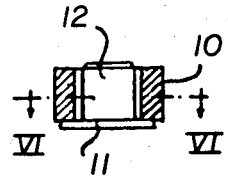
Figure 4:
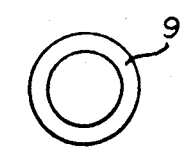
FIGS. 4 and 5 illustrate an annular arresting buffer in accordance with the invention.
Figure 5:
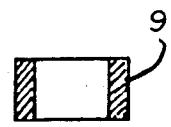

The arresting buffer may also be implemented as illustrated in FIGS. 6 and 7. In this case the elastic ring 10 is arranged around an inner core 12, which is terminated at its bottom by a footplate 11 which engages the conveying means 2. The core 12 and footplate 11 are as in the case of the support block 8, made from a material with suitable gliding properties enabling the arresting buffer to glide relative to the conveying means 2. The diameter of the core 12 is less than the inner diameter of the elastic ring 10, so that there is a clearance between these parts. On compression in the conveying direction, the ring 10 expands, as in the case of ring 9, against the opposing side wall 4,4 of the trough. Both the compression and lateral expansion of the ring as illustrated in FIG. 9 are determined by the clearance between the core 12 and the interior diameter of the ring. This arrangement makes possible some control of the braking force by adjusting the clearance between ring and core. The arresting buffer in this embodiment otherwise works in principle in the same way as described for the embodiment of FIG. 8.

As mentioned hereinbefore, the arresting buffer may either be freely movable between the objects or carriers or may be connected to a carrier. In the latter case the connection may take the form of a hook one end of which is rigidly connected to the carrier, the opposite free end extending freely down into ring 9 or into an opening in the core 12. The buffer in the latter case accompanies the carrier without its deformation potential being in any way adversely affected.

Figure 10:
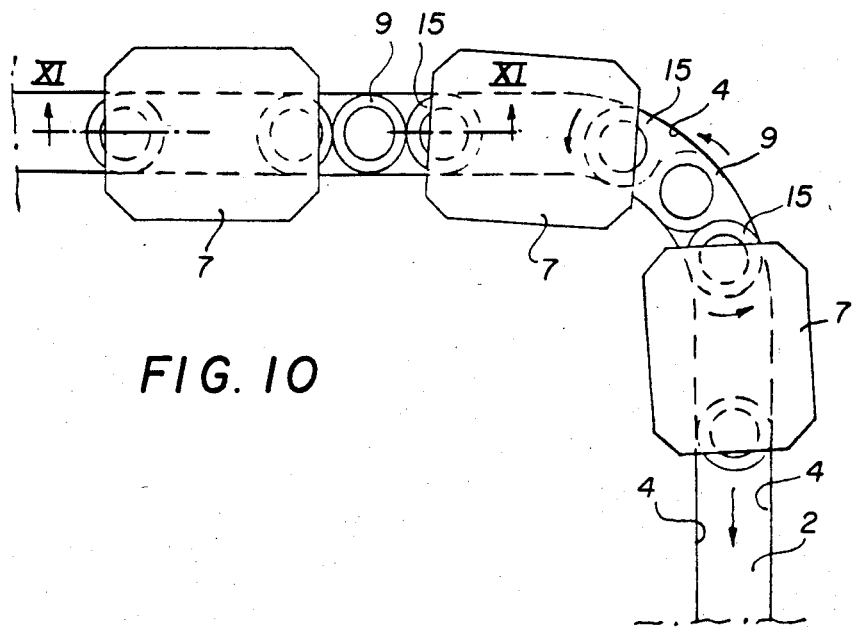
FIG. 10 is a plan view of a further embodiment of the invention, the carriers being provided with rotatably mounted guide rings placed around the supporting block, the conveyor extending in a curve.
Figure 11:
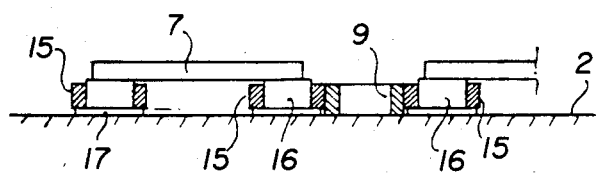
FIG. 11 is a section along the line XI—XI in FIG. 10.

FIG. 10 illustrates an embodiment of the invention having an especially effective action when the conveyor follows a curve. In this case modified guide rings 15 are rotatably mounted about modified support blocks 16. As with the previously described embodiments, the diameter of each guide ring is such that the ring has a small clearance to the side walls 4,4 for guiding the carrier 7. At its bottom end each support block is terminated by a radial flange 17 so that the block rests on the conveying means 2 and guide ring 15 rests on the flange without engaging the conveying means. The outer circumference of the guide ring extends beyond the periphery of the flange and thus constitutes an impact surface for the carrier in the transport direction (see FIG. 11). An annular arresting buffer 9 is arranged between each carrier, as already described. When the carriers 7,7 are conveyed, one after the other through a curve, the guide rings 15,15, as well as the intermediate arresting ring 9, will rotate in the direction of the arrows illustrated on the figure, as a result of frictional engagement with the outer side wall 4 in the region of the curved section of the guide trough. The carriers are conveyed on the conveyor means 2 in the direction of the arrow shown on the figure. When the first carrier in the conveying direction shown in FIG. 10 is stopped at a predetermined station along the conveying direction, the following carrier on approaching the first carrier will exert a pressure against the buffer ring 9, causing it to expand in the transverse direction of the conveyor, ring 9 thus ceasing to rotate. The guide ring 15 forced against buffer ring 9 will thus also be prevented from rotating and will become wedged between the buffer ring 9 and the outer wall 4 of the trough. A similar situation also occurs for the guide ring 15 on the opposite side of the buffer ring 9, this ring 15 being acted on by the minor force s discussed above. This effect is relatively small, however. By virtue of the friction created between the outer side wall 4 and the respective rings 9 and 15 there is thus obtained an increased braking action against the following carrier 7. Any augmented dampened braking action is obtained by the intrinsic elasticity of the guide ring 15.

The guide rings 15 are suitably made from the same elastic material as the buffer rings 9, preferably urethane. The modified support blocks 16, as with the previously described embodiment, can be made from steel and are fixed to the carrier plate 7. Since there is greater friction between a urethane guide ring 15 and the wall 4 than between a steel support block 8 steel and said wall, it will be clear that braking action in the curved zone is increased when such guide rings 15 are used. Apart from this increased braking action, the arrangement with special guide rings such as ring 15 has the advantage that the carrier glides more easily through a curve while the guide rings rotate against the outer curve wall 4 so that the wear which would occur between a fixed steel support block and wall 4 is eliminated. The invention thus enables a carrier to be conveyed with less resistance through a curve, while at the same time enabling more effective braking of the carrier by virtue of the coaction between the buffer ring 9 and guide ring 15. In conveying carriers through a curve with the arrangement according to FIG. 10, no disadvantage results from the engaging rotating rings 9 and 15 since the friction of urethane-urethane element is considerably less than the friction which would occur if urethane-metal elements were used.

What is claimed is:

1. A braking system for a conveyor for objects conveyed by the conveyor to and stopped at assembly or processing stations for a work performing operation on the objects, said conveyor including a continuously moving conveying means, the movement of which is guided in a trough defined by parallel side walls, said braking system comprising support block means supporting the objects for movement on the conveying means, and elastic ring means freely disposed between adjacent support block means for gliding movement of the ring means on the conveying means, said ring means being compressed in the conveying direction of said objects by the support block associated with the trailing object when the trailing object reaches the station whereat the object to be worked on is stopped, said elastic ring means being laterally expanded from a circular into an oval form for functionally engaging said side walls and thereby braking the movement of the trailing object to minimize its impact on the object being worked on.

2. A system according to claim 1, wherein the objects rest on carriers guided by said support block means between the side walls of the conveyor, the support block means glidably resting on the moving conveying means.

3. A system according to claim 1, wherein the elastic ring means comprises a cylindrical means having a diameter to provide a clearance between it and the side walls when the elastic ring means are unstressed.

4. A system according to claim 1, wherein the elastic ring means is a ring arranged about a core and engages the conveying means, the diameter of the core being less than the inner diameter of the elastic ring means.

5. A system according to claim 1, wherein the elastic ring means is directly connected to a carrier guided by said support block means.

6. A system according to claim 1, wherein the support block means are guided between the side walls of the conveyor via cylindrical guide rings rotatably carried about and by the support block means, the elastic ring means being expanded for braking between said guide rings.

7. A braking system according to claim 1, wherein said support block means support the objects for movement with the conveying means when the objects are moving between stations and comprising a material to enable gliding of said objects relative to said conveyor when said objects are stopped at a station for a work performing operation thereat.

8. A conveyor for objects conveyed between work performing stations serviced by the conveyor and comprising a base member having a central trough defined by side walls, a conveying means continuously movable within said trough for conveying objects to a work performing station whereat the object to be worked on is stopped, arresting buffers in said trough between said objects and comprising elastic rings the axes of which are perpendicular to the direction of movement of said conveying means, said elastic rings being subjected to compressive forces in said direction of movement of said conveying means when a trailing object reaches a stationary object, said elastic rings on being subjected to said compressive forces expanding laterally from a circular to an oval form to frictionally engage said side walls producing thereby a braking action which prevents interference with the work performing operation on said stationary object.

9. A conveyor according to claim 8, wherein the arresting buffers comprise elastic members having cylindrical contours and a diameter to provide a clearance between the elastic members and the guide walls when the elastic members are unstressed.

10. A conveyor according to claim 8, wherein the support blocks are guided between the guide walls of the conveyor via cylindrical guide rings rotatably carried about and by the support blocks, said arresting buffers comprising elastic rings expanded for braking between said guide rings.

11. The conveyor of claim 8, wherein said objects are supported on support block means for movement with the conveying means when the objects are moving between stations and being made of a material to enable gliding of said objects relative to said conveying means when said objects are stopped at a station for a work performing operation thereat.

* * * * *